US009532180B2

(12) United States Patent
Dribinski et al.

(10) Patent No.: US 9,532,180 B2
(45) Date of Patent: Dec. 27, 2016

(54) METHOD OF ANALYSING DATA COLLECTED IN A CELLULAR NETWORK AND SYSTEM THEREOF

(71) Applicant: Cellwize Wireless Technologies Pte. Ltd., Singapore (SG)

(72) Inventors: Daniel Dribinski, Rishon-Lezion (IL); Evgeny Finkel, Petah-Tikva (IL); Sergei Edelstein, Herzliya (IL)

(73) Assignee: Cellwize Wireless Technologies Ltd., Tel Aviv (IL)

( * ) Notice: Subject to any disclaimer, the term of this patent is extended or adjusted under 35 U.S.C. 154(b) by 12 days.

(21) Appl. No.: 14/742,978

(22) Filed: Jun. 18, 2015

(65) Prior Publication Data

US 2015/0373501 A1    Dec. 24, 2015

Related U.S. Application Data

(60) Provisional application No. 62/014,352, filed on Jun. 19, 2014.

(51) Int. Cl.
*H04W 24/00* (2009.01)
*H04W 4/02* (2009.01)

(52) U.S. Cl.
CPC ............ *H04W 4/028* (2013.01); *H04W 4/021* (2013.01)

(58) Field of Classification Search
CPC ........ H04W 4/02; H04W 4/025; H04W 4/026; H04W 4/027; H04W 4/028; H04W 24/00
USPC .................. 455/423, 424, 425, 456.1, 456.2, 456.3, 455/456.5, 456.6
See application file for complete search history.

(56) References Cited

U.S. PATENT DOCUMENTS

| | | | |
|---|---|---|---|
| 7,206,573 B1 | 4/2007 | Weaver et al. | |
| 8,165,599 B1 | 4/2012 | Dronamraju et al. | |
| 8,364,141 B1 | 1/2013 | Kateley et al. | |
| 2004/0067759 A1 | 4/2004 | Spirito et al. | |
| 2005/0246334 A1* | 11/2005 | Tao | H04W 64/00 |
| 2007/0117572 A1 | 5/2007 | Adam et al. | |
| 2007/0129086 A1 | 6/2007 | Toone | |
| 2009/0011779 A1 | 1/2009 | MacNaughtan et al. | |
| 2012/0213105 A1 | 8/2012 | Wigren | |

(Continued)

FOREIGN PATENT DOCUMENTS

GB    2352134 A    1/2001

*Primary Examiner* — Christopher M Brandt
(74) *Attorney, Agent, or Firm* — Wiggin and Dana LLP; Gregory S. Rosenblatt; Jonathan D. Hall

(57) ABSTRACT

There is provided a method of analyzing data collected in a cellular network and system thereof. The method comprises: repeatedly processing a first subset of the collected data to geo-locate mobile devices, thereby giving rise to geo-location data informative of geo-located mobile devices and associated time-stamped geo-locations thereof, wherein geo-locating is provided with the help of a geo-locating transformation function generated by unsupervised learning, by the processor, of a second subset of the collected data. The method further comprises processing the geo-location data to obtain time-stamped track points, each track point is associated with a respective mobile device and is characterized by geo-location, azimuth and velocity; storing the obtained track points in association with data indicative of respective mobile devices and time-stamps, thereby generating a geo-location database; and processing the geo-location database, to obtain one or more metrics of the cellular network as a function of, at least, respective geo-coordinates.

20 Claims, 10 Drawing Sheets

(56) References Cited

U.S. PATENT DOCUMENTS

| | | | |
|---|---|---|---|
| 2012/0258729 A1 | 10/2012 | Siomina et al. | |
| 2012/0264447 A1 | 10/2012 | Rieger | |
| 2013/0122855 A1 | 5/2013 | Kenington | |
| 2013/0157688 A1 | 6/2013 | Kateley et al. | |
| 2013/0210409 A1 | 8/2013 | Grayson | |
| 2013/0237248 A1* | 9/2013 | Park | H04W 24/00 455/456.1 |
| 2014/0031030 A1* | 1/2014 | Chou | H04B 7/0469 455/423 |
| 2014/0128057 A1* | 5/2014 | Siomina | H04J 3/0685 455/423 |

* cited by examiner

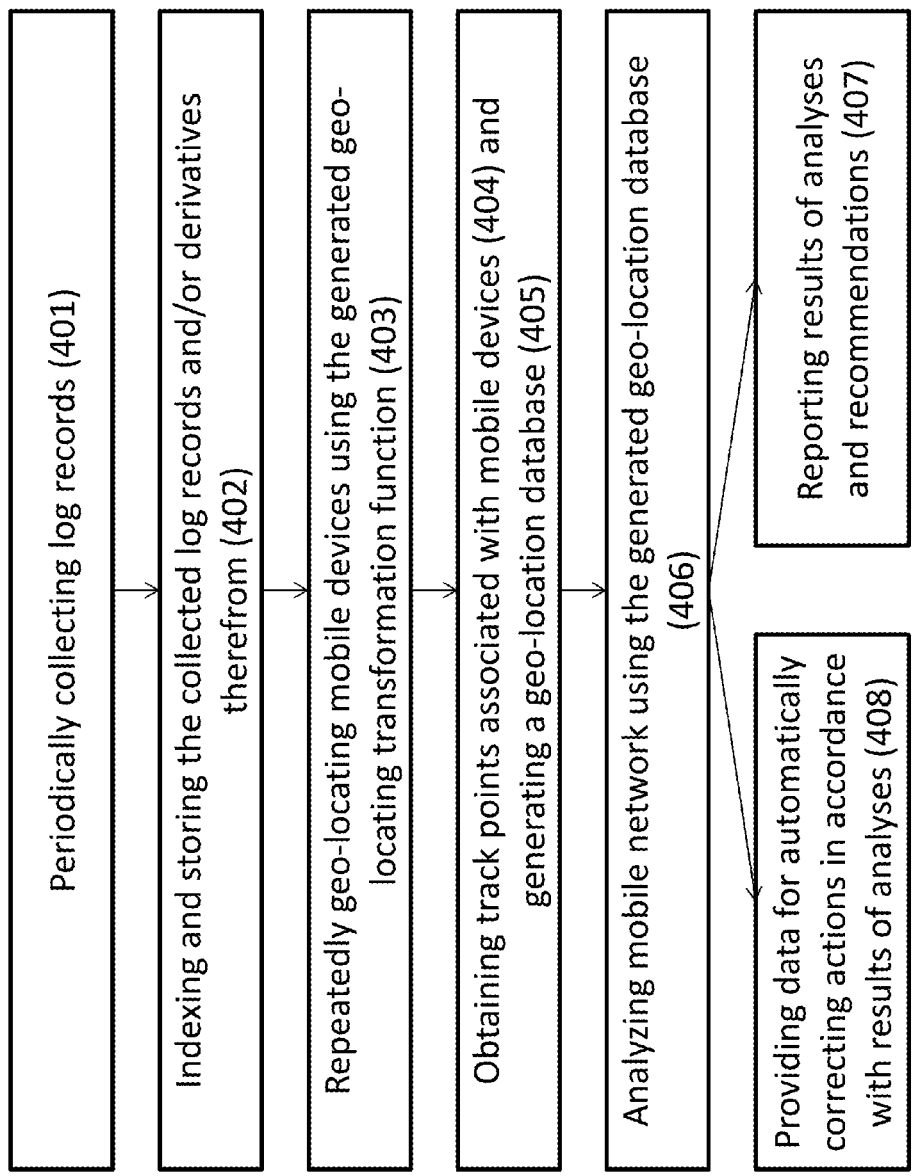

METHOD OF ANALYSING DATA COLLECTED IN A CELLULAR NETWORK AND SYSTEM THEREOF

CROSS-REFERENCE TO RELATED APPLICATION

The present application claims priority to U.S. Provisional Patent Application No. 62/014,352 filed on Jun. 19, 2015. The content of U.S. 62/014,352 is hereby incorporated by reference in its entirety.

FIELD

The presently disclosed subject matter relates generally to systems and methods of cellular communication and, in particular, to systems and methods of using geo-location data for maintaining and/or optimizing a cellular network.

BACKGROUND

Geo-location data play an important role in maintaining and/or optimizing modern cellular networks. For example, it may be useful for wireless network operators to understand the geographic distribution of mobile devices and respectively assess geographic distribution of a quality of network service. Geo-location data can be used for identifying locations with a high rate of dropped calls, poor coverage, interference from a neighbouring cell, etc.

Problems of using geo-location data for maintaining and/or optimizing a cellular network have been recognized in the conventional art and various techniques have been developed to provide solutions. For example:

U.S. Pat. No. 7,206,573 discloses a method and system for automatically providing, to a network entity in a wireless network, a call-drop location. The mobile station or base station may determine that a call, in which the mobile station was engaged, has been dropped. In response to determining that a call has been dropped, the mobile station or base station may obtain the location of the mobile station. The call-drop location can be used to identify those areas of the wireless network needing improved radio coverage.

US Patent Application No. 2007/0129086 discloses a method and apparatus for identifying a geographic area having undesirable wireless service. The method includes collecting Radio frequency (RF) environment information of the wireless service, determining locations of a plurality of subscriber units based on the RF environment information, and processing the RF environment information and the locations of the plurality of subscriber units to identify the geographic area having the undesirable wireless service.

US Patent Application No. 2013/0157688 discloses a system for maintaining or optimizing a mobile phone network. The system comprises a plurality of data feeds including at least one radio access network (RAN) data feed to receive RAN performance data relating to performance of a radio access network of a mobile phone network over a period of time, wherein RAN performance data is associated with RAN performance geo-location data. The plurality of data feeds further includes at least one subscriber account data feed including subscriber account geo-location data defining physical locations of subscriber accounts within region of coverage of RAN. The system further comprises a spatial data integration system coupled to data feeds and configured to combine RAN performance data, RAN performance geo-location data, subscriber account data, and subscriber account geo-location data into an integrated spatial data structure, wherein integrated spatial data structure is indexed by at least a spatial element identifier and an attribute identifier.

Geo-location data are indicative of the real-world geographical location of mobile devices. Geo-location of mobile devices can be performed in several ways. For example:

US Patent Application No. 2007/117572 discloses a method for locating and tracking devices in a mobile telephone network comprising the steps of (a) receiving mobile telephone control parameters in a subscriber database; and (b) using one or more location parameter databases (LP-DBs), each mapping control parameters to a geographic location and returning a location result when queried. One or more filters are applied to the control parameters that are received by the subscriber database, each filter selectively initiating processing using a LPDB appropriate to the task of the filter and to the current state of the device.

US Patent Application No. 2009/011779 discloses a method and system for calculating the location of a mobile radio terminal in a radio communications network. The method provides for the collection of measurements of radio signal parameters at the mobile radio terminal which are then processed and transmitted to a network processor for calculating the location of the mobile radio terminal. The collected measurements may be filtered and subsets of the measurements may also be selected according to their suitability for particular applications.

US Patent Application No. 2012/0213105 discloses positioning functionality in a wireless communications network in a multi-carrier system. The network node enables UTDOA (Uplink Time Difference of Arrival) positioning measurements for a wireless device in the multi-carrier system. The network node is configured to receive interference or load related information for carriers available for UTDOA positioning measurements and to select at least one carrier for UTDOA positioning measurements based on the interference or load related information.

US Patent Application No. 2012/0258729 discloses estimating position of a mobile device served in a cell of a serving node of a wireless communication network by estimating an angle-of-arrival (AoA) between the mobile device and the serving node based on a precoding matrix indicator (PMI) determined for the serving node in a downlink direction or for the mobile device in an uplink direction. Also estimated is the AoA between the mobile device and a non-serving neighbour node of the wireless communication network based on a PMI determined for the neighbour node in the downlink direction or for the mobile device in the uplink direction. The downlink and/or uplink AoA estimation can be further enhanced by employing interference cancellation in the mobile device and in the radio node, respectively. The position of the mobile device is estimated based on the estimated AoAs.

US Patent Application No. 2012/0264447 discloses a technique for tracking a wireless device. Upon receiving signal strength data for each of a plurality of access points, the signal strength data from the plurality of access points is compared to identify an anchor access point having a highest signal strength. Remaining signal strength data from the plurality of access points are compared to a threshold signal strength to identify at least one attractor access point. A memory is accessed for locations of the anchor access point and the at least one attractor access point. A pull point is calculated along a line from the anchor access point to the at least one attractor access point. A location of the wireless device is estimated as an average of the pull point and the location of the anchor access point.

US Patent Application No. 2013/0122855 discloses a geo-location data acquisition system and method for acquiring communication session data from a mobile radio communications network. A data extraction module extracts call session data continuously from a network of call processors, each call processor supporting mobile communication units in an associated geographical region of the coverage area of the mobile radio communications network. The data extraction module provides the extracted data to one of several storage areas. In each storage area, a record is created of the communication session data for each call made within the coverage area of an associated set of call processors. The records stored in each storage area comprise the data available for all communication sessions in the geographical region associated with the corresponding set of call processors.

U.S. Pat. No. 8,165,599 discloses estimating a location of a mobile station based on wireless communications between the mobile station and a wireless telecommunications network. Call measurement data is obtained for a call involving the mobile station and a plurality of base station antennas. The call measurement data includes round-trip delay (RTD) measurements and received signal strength (RSS) measurements. Expected signal strength is calculated for each significant base station antenna involved in the call, according to a wireless propagation model that accounts for terrain around the base station antennas. For each significant base station antenna, the corresponding expected signal strength, RTD measurement, and RSS measurement are used to calculate an adjusted RTD value. The one or more adjusted RTD values calculated for the one or more significant base station antennas are used to estimate the mobile station's location.

GB Patent Application No. 2352134 discloses a method of locating a mobile telephone handset. The method comprises the steps of (i) calculating a predicted signal property such as signal strength or observed time difference for a plurality of possible locations for the handset, (ii) comparing the predicted signal property with a measured signal property and (iii) deriving from the comparison a probability that the handset is at one or more of the locations. The method can be refined by combining the thus derived probability map with a probability map based on geographical information, or historical data, or both. Thus a peak probability which moves along a path parallel to a road indicates the handset is on that road. Several probability maps, for example based on time differences, signal strength, geographical data and historical data, can be combined simultaneously or sequentially to identify a peak probability.

The references above teach many principles of geo-locating and using thereof that are applicable to the presently disclosed subject matter. Therefore the full contents of these publications are incorporated by reference herein for teachings, where appropriate, of additional or alternative details, features and/or technical background.

SUMMARY

In accordance with certain aspects of the presently disclosed subject matter, there is provided a method of analysing data collected in a cellular network, the collected data indicative of network events and associated with mobile devices. The method comprises: repeatedly processing, by a processor, a first subset of the collected data to geo-locate mobile devices, thereby giving rise to geo-location data informative of geo-located mobile devices and associated time-stamped geo-locations thereof, wherein geo-locating is provided with the help of a geo-locating transformation function generated by unsupervised learning, by the processor, of a second subset of the collected data. The method further comprises processing, by the processor, the geo-location data to obtain time-stamped track points, each track point is associated with a respective mobile device and is characterized by geo-location, azimuth and velocity; storing, in a memory operatively coupled to the processor, the obtained track points in association with data indicative of respective mobile devices and time-stamps, thereby generating a geo-location database; and processing, by the processor, the geo-location database, to obtain one or more metrics of the cellular network as a function of, at least, respective geo-coordinates. The metrics can be indicative of quality, traffic, user behaviour, etc. Optionally, the metrics can be obtained as a function of one or more groups of geo-location coordinates and/or of time period.

Relationship between the first subset and the second subset fits a condition selected from a group constituted by following conditions: a) all network events corresponding to collected data in the second subset happened before network events corresponding to collected data in the first subset; b) at least part of collected data is shared by the first subset and the second subset; c) the first subset and the second subset share the same collected data.

In accordance with further aspects of the currently presented subject matter, generating the geo-locating transformation function can comprise: generating a training database; generating a qualified training dataset using the generated training database, wherein the qualified training dataset is informative of statistically highly-probable relationship between combinations of one or more RRC parameters in relation to a mobile device and its geo-location; using the generated qualified training dataset for generating one or more intermediate geo-positioning transformation functions representing relationship between radio measurements and distance to location; and selecting one or more generated intermediate geo-positioning transformation functions in accordance of its level of confidence and generating geo-locating transformation function in accordance with the provided selection.

In accordance with further aspects of the currently presented subject matter, obtaining one or more metrics of the cellular network can comprise: associating a) obtained from the geo-location database track points with zero velocity with b) data indicative of call-drop events and time thereof and obtained from the collected data, wherein associating is provided in accordance with mobile devices and time-stamps respectively associated with the track points and with data indicative of call-drop events; using the associated track points to determine geo-location of the respectively associated mobile devices at the moments of call-drop events, thereby giving rise to geo-located call-drop events; and generating a dropped calls metric as a function of the determined geo-located call-drop event.

In accordance with further aspects of the currently presented subject matter, obtaining one or more metrics of the cellular network can comprise: processing the geo-location database to identify mobile devices associated with a road of interest to yield road mobile devices, wherein identifying a given mobile device is provided in accordance with relative characteristics of one or more track points associated with the given mobile device and the road characteristics; associating track-points of the road mobile devices with data indicative of call-drop events and time thereof and obtained from the collected data, wherein associating is provided in accordance with road mobile devices and time-stamps respectively associated with the track points and with data indicative of call-drop events; using the associated track points to determine geo-location of the respectively associated road mobile devices at the moments of call-drop events, thereby giving rise to geo-located call-drop events; and generating a dropped calls metric as a function of the determined using the geo-located call-drop event, wherein geo-locations and the dropped call metric are defined with respect the road.

In accordance with further aspects of the currently presented subject matter, obtaining one or more metrics of the cellular network can comprise: associating a) obtained from the geo-location database track points with b) data indicative of call details associated with mobile devices and obtained from the collected data, wherein associating is provided in accordance with mobile devices and time-stamps respectively associated with the track points and with data indicative of call details; using the associated track points to determine geo-location of the respectively associated mobile devices at the moments of calls, thereby giving rise to geo-located call events; calculating for each given geo-located call event a distance between respective mobile device and access point serving this mobile device AP during the given geo-located call event; and identifying over-shooting access points using the calculated distances.

In accordance with further aspects of the currently presented subject matter, the method can further comprise updating the geo-locating transformation function responsive to one or more correcting actions provided by a SON system.

In accordance with further aspects of the currently presented subject matter, the method can further comprise communicating at least one generated quality metric to a SON system, thereby enabling corresponding correction actions by the SON system. Optionally, the communicated quality metric can be indicative of a geographical area requiring SON-based actions.

In accordance with other aspects of the currently presented subject matter, there is provided a system capable of analysing data collected in a cellular network, the collected data indicative of network events and associated with mobile devices. The system comprises a processor operatively coupled to a memory, wherein the processor is configured to: repeatedly process, a first subset of the collected data to geo-locate mobile devices, thereby giving rise to geo-location data informative of geo-located mobile devices and associated time-stamped geo-locations thereof, wherein the processor is further configured to provide geo-locating with the help of a geo-locating transformation function generated by unsupervised learning of a second subset of the collected data. The processor is further configured to obtain time-stamped track points by processing the geo-location data, each track point is associated with a respective mobile device and is characterized by geo-location, azimuth and velocity; to generate a geo-location database comprising the obtained track points in association with data indicative of respective mobile devices and time-stamps, and to enable storing the geo-location database in the memory; and to process the geo-location database to obtain one or more metrics of the cellular network as a function of, at least, respective geo-coordinates.

In accordance with other aspects of the currently presented subject matter, there is provided a computer program product implemented on a non-transitory computer usable medium having computer readable program code embodied therein to cause the computer to perform a method of analysing data collected in a cellular network, the collected data indicative of network events and associated with mobile devices.

BRIEF DESCRIPTION OF THE DRAWINGS

In order to understand the disclosed subject matter and to see how it may be carried out in practice, embodiments will now be described, by way of non-limiting example only, with reference to the accompanying drawings, in which:

FIG. 4 illustrates a generalized flow diagram of assessing geo-locations of mobile devices in accordance with certain embodiments of the presently disclosed subject matter;

DETAILED DESCRIPTION

In the following detailed description, numerous specific details are set forth in order to provide a thorough understanding of the disclosed subject matter. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "calculating", "determining", "generating", "identifying", "searching", or the like, refer to the action and/or processes of a computer that manipulate and/or transform data into other data, said data represented as physical, such as electronic, quantities and/or said data representing the physical objects. The term "computer" should be expansively construed to cover any kind of electronic device with data processing capabilities including, by way of non-limiting example, the network information system disclosed in the present application.

The operations in accordance with the teachings herein may be performed by a computer specially constructed for the desired purposes or by a general-purpose computer specially configured for the desired purpose by a computer program stored in a computer readable storage medium.

It is to be understood that the term "non-transitory" is used herein to exclude transitory, propagating signals, but to include, otherwise, any volatile or non-volatile computer memory technology suitable to the presently disclosed subject matter.

Embodiments of the presently disclosed subject matter are not described with reference to any particular programming language. It will be appreciated that a variety of programming languages may be used to implement the teachings of the presently disclosed subject matter as described herein.

Figure 1:
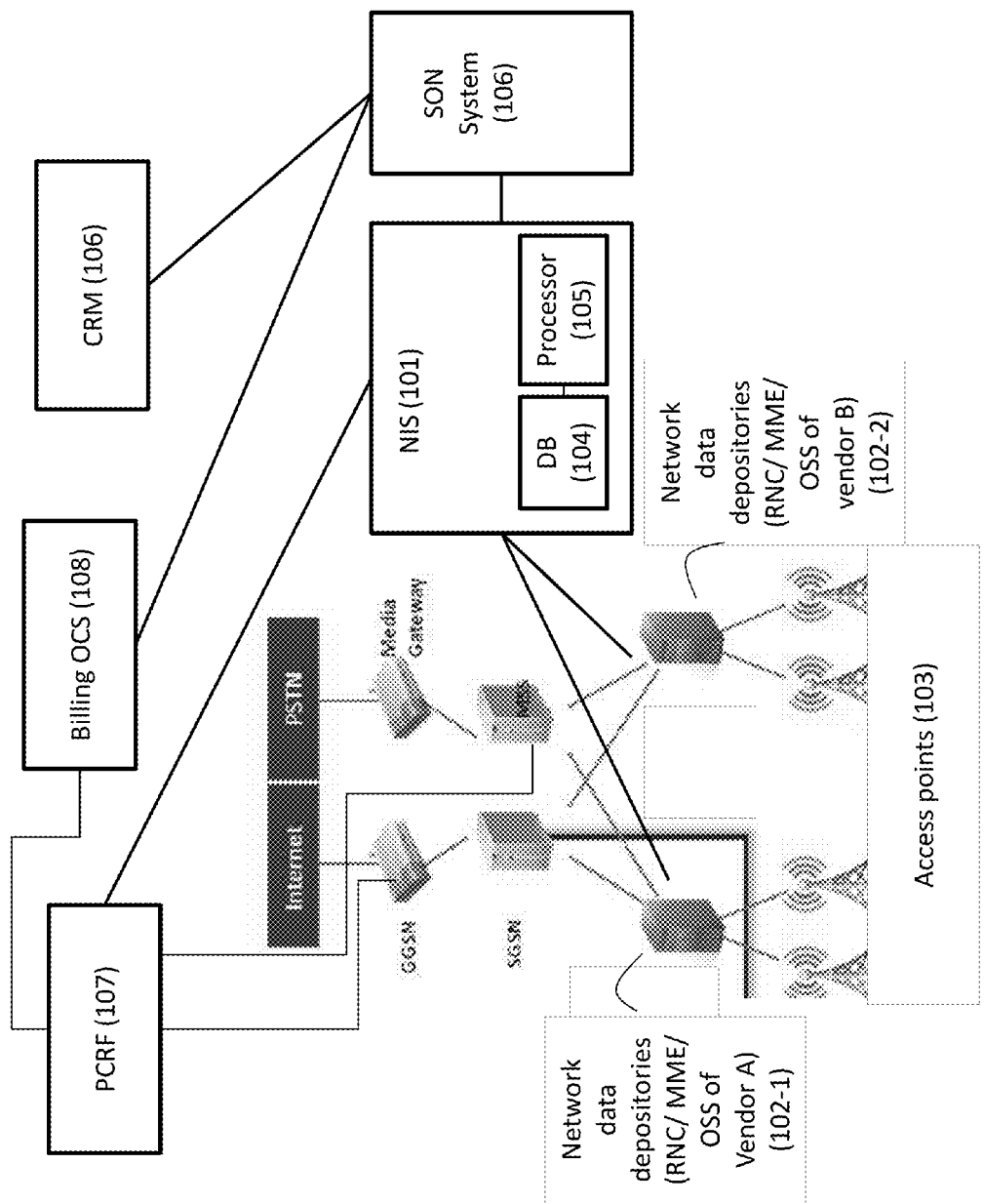
FIG. 1 illustrates a generalized network environment including a network information system configured in accordance with certain embodiments of the presently disclosed subject matter.

Bearing this in mind, attention is drawn to FIG. 1 illustrating a non-limiting example of a schematic network environment including a Network Information (NI) Server configured in accordance with certain embodiments of the presently disclosed subject matter. As illustrated in FIG. 1, NI server is operatively connected to one or more network data (ND) depositories 102 (e.g. OSS (Operation and Support System) servers, Radio Network Controller(s) (RNC), Mobile Management Entities (MME) provided by one or more vendors, etc.)

Optionally, NI server can be further operatively connected to a SON system 106 capable of managing a Self Organising Network (SON). Alternatively, the NI server system 101 can be a part of the SON system. The SON system 106 can be connected (by direct connection or through a mediation layer as, for example, OSS server) to access points 103 (e.g. base stations, Node Bs, sectors (e.g. macrocells, picocells and femtocells), etc.) of the cellular network. The SON system can be configured to provide, directly or indirectly, corrective actions with regard to one or more access points.

NI server 101 is configured to obtain from one or more network data (ND) depositories data indicative of events registered in the ND depositories. Typically, NI server periodically receives (in push and/or pull mode) log records collected at the one or more ND depositories during a certain period of time $P_{ND}$ (e.g. time specified as minimal collection time for a certain ND depository, etc.) and accommodates the obtained records and/or derivatives thereof in a memory 104. Likewise, NI server can periodically receive from ND depositories (e.g. from OSS) call detail logs (CDLs), key performance indicators (KPIs), key quality indicators (KQIs) or other quality related data derived from the log records. Alternatively or additionally, NI server can derive KPIs, KQIs and/or other quality related data directly from the obtained log records. NI server is configured to aggregate the log records and other obtained data as will be further detailed with reference to FIGS. 2-9.

Each registered event is associated with one or more records. By way of non-limiting example, an event can be associated with a single record (e.g. propagation delay (PD) record) comprising respective timestamp (TS), IDs of mobile device (IMSI) and ID of respective access point (CELL_ID). By way of another non-limiting example, an event (e.g. RRC (Radio Resource Control) measurement) can be associated with a group of records characterized by the same IMSI and TS and concurrently logged for different access points (i.e. comprising different CELL_IDs). Each such record can comprise signal strength (RSCP), ratio of signal to noise (EcNo), FrameOffset/ChipOffset and, optionally, others fields. The log records are characterized at least by identification information (e.g. IDs of cellular device (IMSI) and access point (CELL_ID), time-indicative information (e.g. timestamp (TS) and/or FrameOfSet/ChipOfSet) and at least one parameter out of a set of parameters characterizing network performance (e.g. propagation delay, RSCP, etc.).

NI server 101 is further configured to obtain (e.g. from OSS and or Planning Tool (not shown)) network configuration information (e.g. longitude/latitude, azimuth, antenna type and parameters like pattern, power, etc. obtained for each Cell_ID) and, optionally, device information (e.g. obtaining for a given IMSI manufacturer, model, version etc.).

NI server 101 comprises a processor 105 operatively coupled to the memory 104 and configured to enable operations as detailed with reference to FIGS. 2-9.

Those versed in the art will readily appreciate that the teachings of the presently disclosed subject matter are not bound by the network architecture illustrated in FIG. 1, equivalent and/or modified functionality can be consolidated or divided in another manner and can be implemented in any appropriate combination of software, firmware and hardware. NI server can be a standalone network entity, or integrated, fully or partly, with other network entities.

Figure 2:
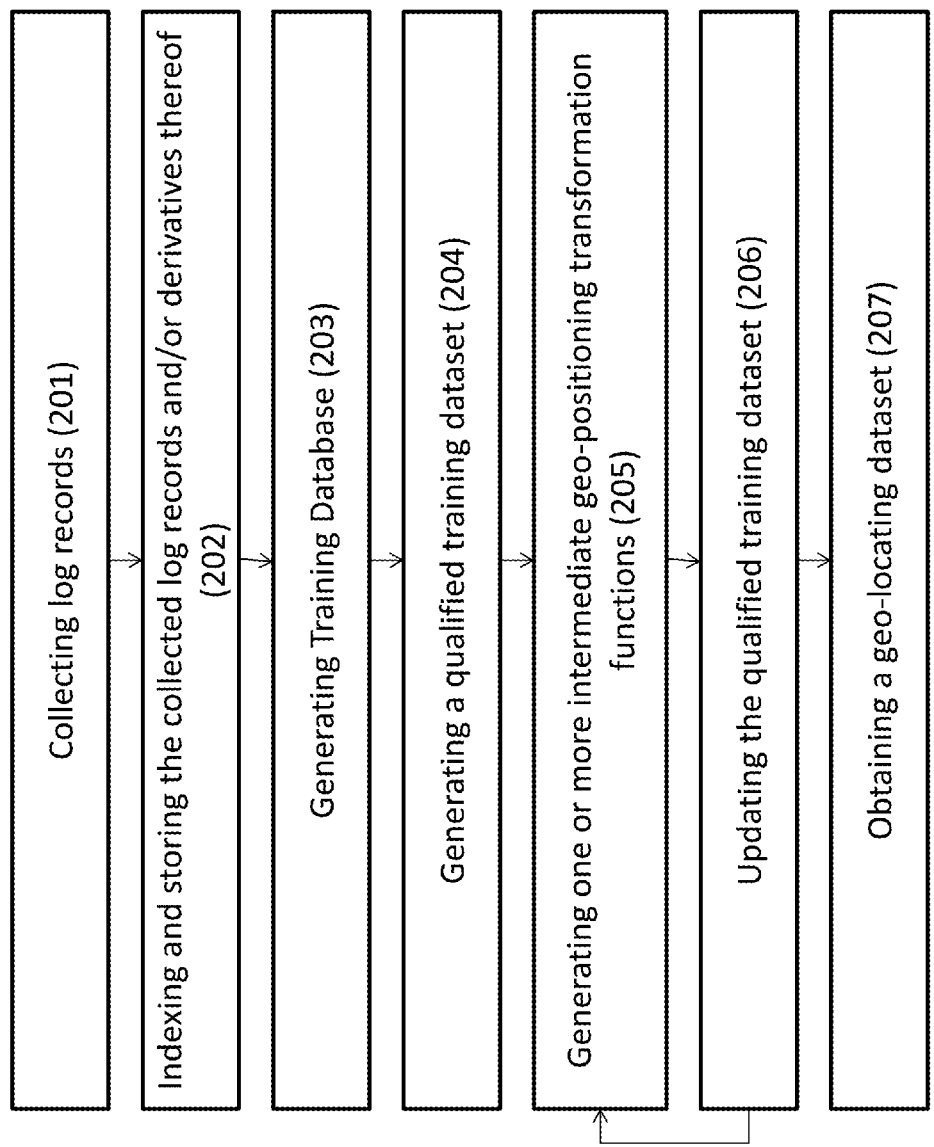
FIG. 2 illustrates a generalized flow diagram of generating a geo-locating transformation function usable for mapping radio measurements in accordance with certain embodiments of the presently disclosed subject matter.

Referring to FIG. 2, there is illustrated a generalized flow diagram of generating a geo-locating transformation function usable for mapping radio measurements (PD, RSCP, EcNo, etc.) into geo-locations of mobile devices. In accordance with certain embodiments of the presently disclosed subject matter, there is provided a technique of unsupervised learning using a combination of data sources, wherein different sources in the combination enable different levels of confidence when geo-locating mobile devices.

In accordance with certain embodiments of the presently disclosed subject matter, NI server 101 collects (201) log records and/or derivatives thereof from one or more ND depositories 102, thereby obtaining (in pull or push mode) data informative of network events and respective radio measurement with regard to access points and mobile devices. The log records can be obtained in different formats as provided by respective operators/vendors. NI server can periodically extract data from the log records and generate event data structures of unified format. NI server indexes the log records and/or event data structures extracted therefrom, and stores (202) the indexed data in memory 104. By way of non-limiting example, NI server can provide indexing by mobile device identifier (e.g. IMSI or derivative thereof), time of logging, access point identifier (CELL_ID), etc.

NI server stores the indexed data during a statistically substantial period (e.g. 1 week, 1 month, etc.), thereby generating (203) a training database usable for unsupervised geo-location learning.

For purpose of illustration only, the following description is made with respect to generating the geo-locating transformation function based on the entire training database. It is noted that, optionally, NI server can be configured to distribute the collected records for storing in a plurality of storage chunks (e.g. 50-100 storage chunks for the entire cellular network). By way of non-limiting example, NI server can associate each log record with a value of hashfunction of respective IMSI and each storage chunk with a range of hash values to be used as chunk selection criteria. Further, NI server can store a given log record in a storage chunk with the range of hash values corresponding to a hash value associated with the given record. Statistical distributions in a storage chunk can be representative of statistical distributions in the entire training database, and the geo-locating transformation function can be generated using data stored in a single chunk and verified using data stored in few other chunks. Additionally or alternatively, training database can be generated separately for different areas/regions of the cellular network (e.g. for scalability purposes, because of built-in differences in usage/service patterns, etc.).

As known in the art, any record informative of CELL_ID of an access point serving a given mobile device can define expected location area of the given mobile device. Such an expected location area looks like a sector (optionally, also including expected back lobe) whose angle depends on AP's azimuth and directivity pattern, and whose radius depends on capacity. Likewise, any record informative of combination of CELL_ID and propagation delay measured for the given mobile device defines expected location area in a more accurate way; namely, as a part of a circle bounded by two radiuses and two arcs, with centres in the antenna point; thus the geo-location can be defined as a cross section of the sector derived by CELL_ID and ring derived by propagation delay.

Figure 3:
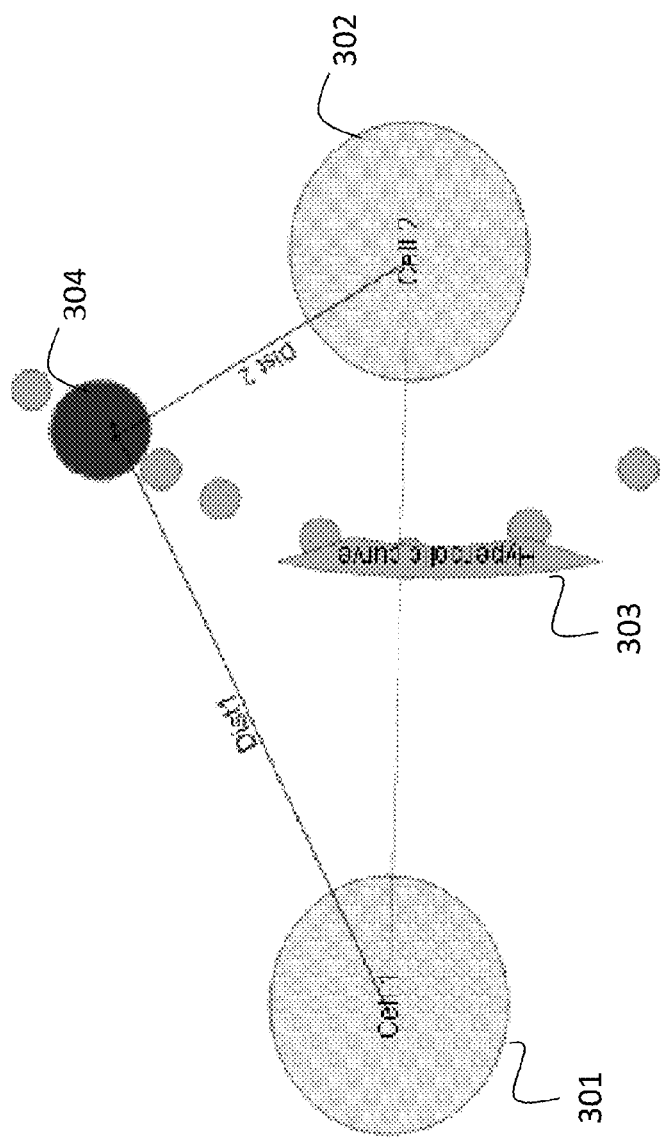
FIG. 3 presents a schematic diagram illustrating a hyperbolic time offset model.

Alternatively, geo-location can be calculated using a hyperbolic time offset model. This model needs preliminary statistical learning and is based on pairs of records from the same RRC measurement, as illustrated in FIG. 3. Having absolute arrival times of the signal which was sent from the detected device to two different antennas, difference in times can be converted into difference of distances from device to access points 301 and 302. So, in this case, the expected location area 304 can be defined as a neighbourhood of the hyperbolic line 303 with focuses in antennas points and metric parameters derived also from the difference in distances. The size of neighbourhood is defined by precision of the difference definition.

In order to define a precise geo-location of a given device within a respective cell sector, the models above require at least three records associated with the same location. However, typically, there are relatively small number of events which are associated with 2 PD records and even less events which are associated with 3 PD records.

In accordance with certain embodiments of the presently disclosed subject matter, NI server parses the training database to identify assumedly static mobile devices associated with radio measurements sufficient for triangulation.

By way of non-limiting example, a mobile device can be assumed as static during a period $T_S=(t_2-t_1)$ if it is associated with substantially equal (within a predefined accuracy) sequential PD measurements provided for the same access point, wherein $t_1$ is the time of first such measurement and $t_2$ is the time of the last such measurement. The assumedly static mobile device can be considered as associated with radio measurements sufficient for triangulation if it is associated with PD measurements provided during the period $T_S$ (referred to hereinafter as a static period) for at least two another access points, and if the differences in geo-locations derived from the above PD measurements match a predefined minimal accuracy.

NI server uses PD records associated during respective static periods with assumedly static mobile devices to generate training data referred to hereinafter as PD-based training data. PD-based training data can be represented by a data structure informative of assumedly static mobile devices, access points associated therewith, measured PD values and respectively calculated geo-locations. PD-based training data can include all identified assumedly static mobile devices or only a part thereof, this part being sufficient for further analyses.

It is noted that, likewise, assumedly static mobile devices associated with radio measurements sufficient for triangulation can be identified by different techniques, for example, by using a hyperbolic time offset model, and time-offset based training data can be used, alternatively or additionally to, PD-based training data.

Geo-location of a given mobile device can be also defined using RRC measurements. In accordance with certain embodiments of the currently disclosed subject matter, for each given assumedly static mobile devices, records collected during the period $T_S$ and associated with different PD and RRC events can be consolidated as corresponding to the same geo-location of the same given mobile device. NI server generates the consolidated RRC-PD data associated with assumedly static mobile devices, and uses the consolidated RRC-PD data to generate (204) training data referred to hereinafter as qualified training dataset.

It is noted that a qualified training dataset can be generated by other techniques enabling obtaining a trusted dataset for further training By way of-non-limiting example, the qualified training dataset can be, likewise, generated for uniformly moving mobile devices associated with radio measurements sufficient for triangulation, such uniform moving can be detected, for example, by linearity test.

Further to PD-based training data, the qualified training dataset comprises different measured/derived parameters corresponding to the consolidated events (e.g. propagation delay together with EcNo and/or RSCP qualified after triangulating location with one or more attributes of the observation) and statistics thereof. By way of non-limiting example, the qualified training dataset can comprise an average signal parameters for each assumedly static mobile device (IMSI), average signal parameters per access point (CELL_ID), antenna attributes per access point (e.g. electrical parameters, tilt, vertical/horizontal beamwidth, etc.), etc. The generated qualified training dataset defines a highly-probable relationship between various combinations of one or more RRC parameters (e.g. EcNo, RSCP, etc.) measured/derived in relation to a mobile device and its geo-location. The qualified training dataset can be used for further unsupervised learning and generating a geo-locating transformation function.

NI server further uses the qualified training dataset to generate (205) one or more intermediate geo-locating transformation functions representing relationship between radio measurements and distance to location. An intermediate geo-locating transformation function is usable (for each CELL_ID or CELL_ID ignorant), of estimation of geo-location in accordance with a combination of one or more radio measurements (PD, RSCP, EcNo, etc.). A given intermediate geo-locating transformation functions is further informative of a level of confidence of such mapping estimated in accordance with a respective statistical base (e.g. number of observations and their confidence). NI server can generate intermediate geo-locating transformation functions in accordance with different techniques.

By way of non-limiting example, an intermediate geo-locating transformation functions can be generated using a regression technique (linear regression model, decision trees, etc.). In accordance with certain embodiments of the presently disclosed subject matter, in order to generate an intermediate transformation functions, NI server uses the qualified training dataset for assessing attributes of access points and generating AP-attributes data structure representing the learned attributes. The AP-attributes data structure is informative of statistical data attributed to each AP in accordance with the qualified training dataset. By way of non-limiting example, for a given AP, statistical data can include estimated typical distance (estTypical) to locations of mobile devices associated with the given AP (e.g. median of corresponding distribution, and/or average of corresponding distribution, etc.), and respective estimated significant typical distance (estSignificant) as, for example, 75% percentile, 80-90% percentile, etc.

NI server further generates an intermediate geo-locating transformation function by applying a regression technique to the AP-attributes data structure. The resulted intermediate geo-locating transformation function (referred to hereinafter as a first function) is informative of relationship between estimated distances (D~PD) from recognized objects to centre of the cells and combinations of cell attributes and RRC measurements.

By way of non-limiting example, the first function can be presented as:

$$PD = avg\_PD + coeff\_rscp*(rscp - avg\_rscp) + coeff\_ecno*(ecno - avg\_EcNo) + coeff\_estTypical*(estTypica - avg\_estTypica) + coeff\_estSignificant*(estSignificant - avg\_estSignificant),$$

wherein estTypical and estSignificant are presented in AP-attributes data structure learned attributes of access points, and RSCP and EcNo are values of respective RRC measurements.

The first function further comprises data indicative of accuracy of provided approximation, for example: error, coeff_rscp, coeff_ecno, coeff_estTypical, coeff_estSignificant.

Alternatively or additionally, NI server can generate an intermediate geo-locating transformation function by aggregating data from the qualified training dataset. Such intermediate geo-locating transformation function (referred to hereinafter as a second function) represents mapping of RRC parameters (e.g. RSCP, EcNo) to statistically defined distance (e.g. avg_PD, std_PD). The second function also represents data indicative of number of measurements used for the statistic results and, respectively, of a level of confidence of the second function.

Alternatively or additionally, NI server can generate an intermediate geo-locating transformation function (referred to hereinafter as a third function) by using the qualified training set for selecting the most trusted access points (corresponding to CELL_IDs with number of observations meeting predefined criteria), and applying regression technique to the data related to the selected access points. By way of non-limiting example, third function can be presented as:

$$PD = avg\_PD + coeff\_rscp*(rscp - avg\_rscp) + coeff\_EcNo*(EcNo - avg\_EcNo).$$

The third function further comprises data indicative of estimation of accuracy of provided approximation, for example: error, coeff_rscp, coeff_ecno.

Accordingly, PD (and corresponding geo-location) can be obtained by using at least one of:
  a. approximation based on the first function;
  b. approximation based on the second function for corresponding CELL_ID (if number of observation is statistically sufficient);
  c. approximation based on the third function for corresponding combination of RRC parameters (e.g. rscp_ecno key), if number of observation is statistically sufficient.

Depending on a level of confidence characterizing each of the one or more intermediate geo-positioning transformation functions, NI server selects one or more generated intermediate functions for further processing. NI server aggregates one or more selected intermediate geo-positioning transformation functions and generates (207) the geo-locating transformation function usable for mapping radio measurements into geo-locations. Aggregation of intermediate geo-positioning transformation functions can be provided in a weighted manner, the weights being in reverse proportion to estimation errors. The generated geo-locating transformation function is informative, for each CELL_ID, of statistic-based correspondence between geo-location of the mobile device served by the respective AP, and a combination of one or more radio measurements (PD, RSCP, EcNo, etc.).

It is noted that the geo-positioning transformation function can be generated directly from the qualified training dataset, for example, by using techniques of decision trees, neural networks, probabilistic networks, etc.

Optionally, NI server can update (206) the qualified training dataset by including PD-RRC values estimated with the help of one or more intermediate functions, and further re-generate one or more intermediate geo-positioning transformation functions using the updated qualified training dataset including both measured and estimated PD values.

NI server stores the generated geo-locating transformation function in the memory 104. NI server re-calculates, at least, AP-attributes data structure and the respective first function responsive to network changes (e.g. changes in neighbouring lists and/or antenna tilts, adding APs, etc.). Optionally, NI server can recalculate the intermediate geo-locating transformation function in accordance with a predefined schedule or on-demand. NI server updates the geo-locating transformation function in accordance with recalculation results. Optionally, NI server can update the geo-locating transformation function responsive to data received from SON system and indicative of correcting actions provided by the SON system in the cellular network.

Referring to FIG. 4, there is illustrated a generalized flow diagram of assessing geo-locations of mobile devices in accordance with certain embodiments of the presently disclosed subject matter.

As detailed with reference to FIGS. 1-2, NI server periodically (e.g. every 15 min.) collects (401) log records and stores (402) the collected log records and/or derivatives thereof (preferably in an indexed form). NI repeatedly (e.g. at pre-defined time, and/or responsive to predefined events, and/or with predefined periodicity, etc.) geo-locates (403) mobile devices. Geo-locating a given mobile device at a given point-in-time comprises identifying log records associated with the given mobile device and deriving data informative of the access point which served the mobile device at the given point-in-time, and of respective radio measurement. Geo-locating further comprises using the geo-locating transformation function for obtaining geo-location corresponding to the derived access point and radio measurements, this geo-location being considered as geo-location of the given mobile device at the given point-in-time.

NI server further stores in the memory 104 data informative of geo-located mobile devices and their geo-locations with respective time-stamps. It is noted that NI server can update the geo-location database in a near-real time mode (e.g. in accordance with minimal collection time of the network data depositaries 102).

Figure 5B:
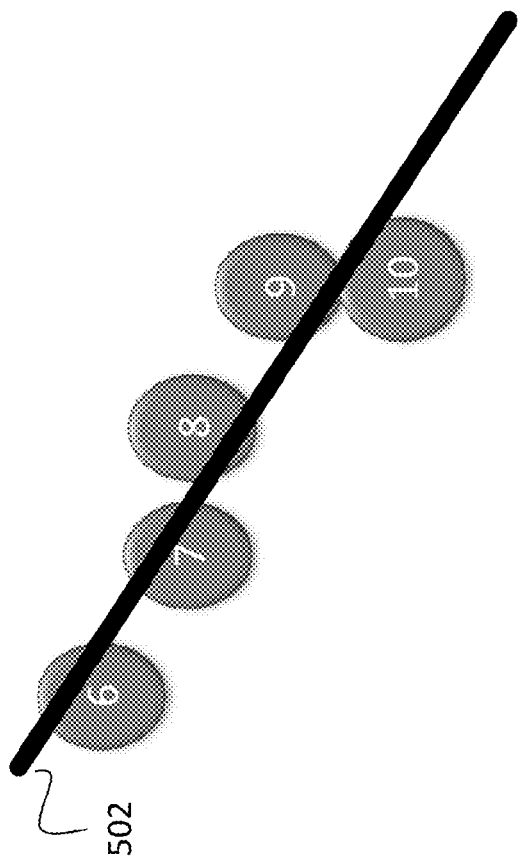
FIGS. 5*a* and 5*b* present schematic diagrams illustrating, respectively, static and moving patterns.
Figure 5A:
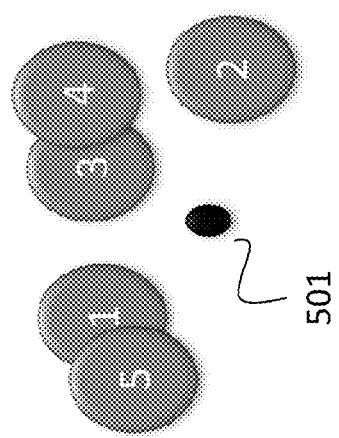

In accordance with certain embodiments of the currently presented subject matter, NI server further processes these stored in the memory data, and obtains (404) time-stamped track points associated with the mobile devices. Track points are characterized by respective geo-location, azimuth and velocity (equal to zero for static mobile devices). By way of non-limiting example, NI server can decide if a given mobile device is moving or static by comparing the predefined patterns, and can consider the given device as static if the first pattern of measurements is more detectable, and as moving if the second pattern of measurements is more detectable. The first pattern is illustrated in FIG. 5*a* and is characterized for the given mobile device by substantially the same sequential geo-locations (illustrated as 1-5) corresponding to point (501). The second pattern is illustrated in FIG. 5*b* and is characterized for the given mobile device by sequential geo-locations (illustrated as 6-10) corresponding to line (502). The number of geo-locations of a given mobile device required for a static/moving decision can be configurable. Azimuth and velocity of a moving track point can be estimated using any suitable geo-tracking algorithm.

Referring back to FIG. 4, NI server stores the obtained track points in association with time stamps and respective mobile devices, thereby generating (405) a geo-location database. Optionally, if none of the above patterns is detectable with a required accuracy/likelihood for a given mobile device, the given mobile device can be excluded from the geo-location database.

NI server uses the generated geo-location database for mobile network analyses (406). Non-limiting examples of such analyses are further detailed with reference to FIGS. 6-9. The results of network analyses (and optional recommendations) can be reported (407) to a network operator or can be communicated to a SON system 106 for enabling corresponding correction actions (408). Optionally, the results communicated to SON system can be usable for decision of what correcting actions selected by SON system (and/or in which areas/parts of the network).

It is noted that NI server can analyse data in the geo-location database in a repeating mode (e.g. at pre-defined time; and/or responsive to predefined events as, for example, update of the geo-location database; on demand; with pre-defined periodicity, etc.). By way of non-limiting example, NI server can analyse data in the geo-location database in a near-real time mode (e.g. in accordance with minimal collection time of the network data depositaries 102).

The results of the analyses can be indicative of different metrics of the cellular network and elements thereof (e.g. quality metrics, density and/or traffic metrics, user behaviour metrics (e.g. busy hours, moving velocity), significance of the network elements (e.g. access points), etc.).

In certain embodiments of the presently disclosed subject matter, the results of the analyses can be indicative of importance of clients associated with mobile telephones corresponding to a special geo-location (e.g. geo-location corresponding to a highway, to special buildings and campuses, etc.).

Figure 6:
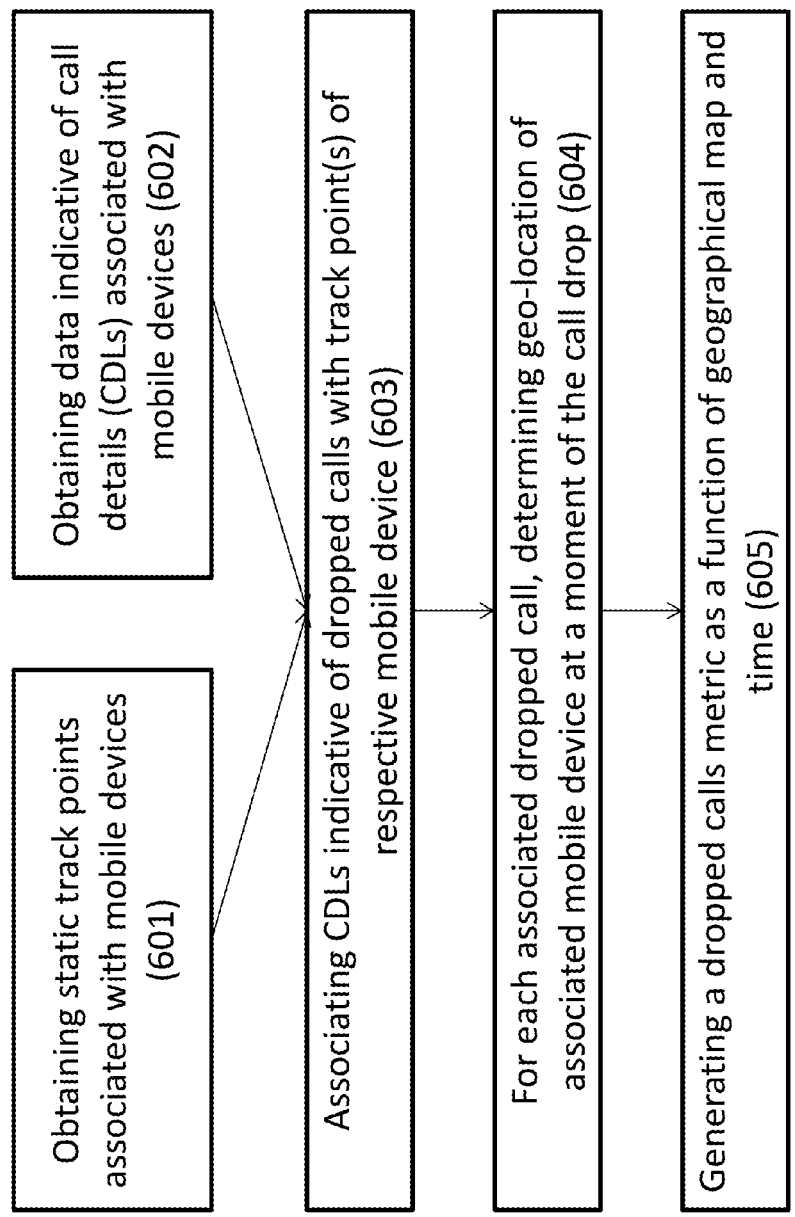
FIG. 6 illustrates a generalized flow diagram of using the generated geo-location database for DCR (Drop Call Rate) mapping in accordance with certain embodiments of the presently disclosed subject matter.

Referring to FIG. 6, there is illustrated a generalized flow diagram of using the generated geo-location database for DCR (Drop Call Rate) mapping in accordance with certain embodiments of the presently disclosed subject matter. NI server parses (601) the geo-location database and obtains track points associated with static mobile devices (velocity equal to zero). NI server also parses the log records and obtains data (602) indicative of call details associated with mobile devices. Such data can be obtained from Call Details Logs (CDL) or derived from other log records. NI server associates (603) CDLs indicative of dropped calls and time thereof with track point(s) of the respective mobile device. The associating can be provided in accordance with correspondence between both: 1) IMSI in CDL and IMSI associated with track point and 2) drop-call indicative time in CDL and time-stamp associated with track point. The associated track point is indicative of geo-location of the mobile phone at the time of the respective call drop. Accordingly, for each associated dropped call, NI server determines (604) geo-location of the respective mobile device at a moment of the call drop and processes obtained data to generate (605) a dropped calls metric (e.g. DCR) as a function of geographical coordinates or groups thereof (geographical areas). Optionally, the drop call metric can be generated as also a function of time and/or time periods (e.g. busy hours, sleeping hours, etc.). The metric can be visualized (e.g. as 2D or 3D map of the mobile network and/or respective physical territory).

Figure 7:
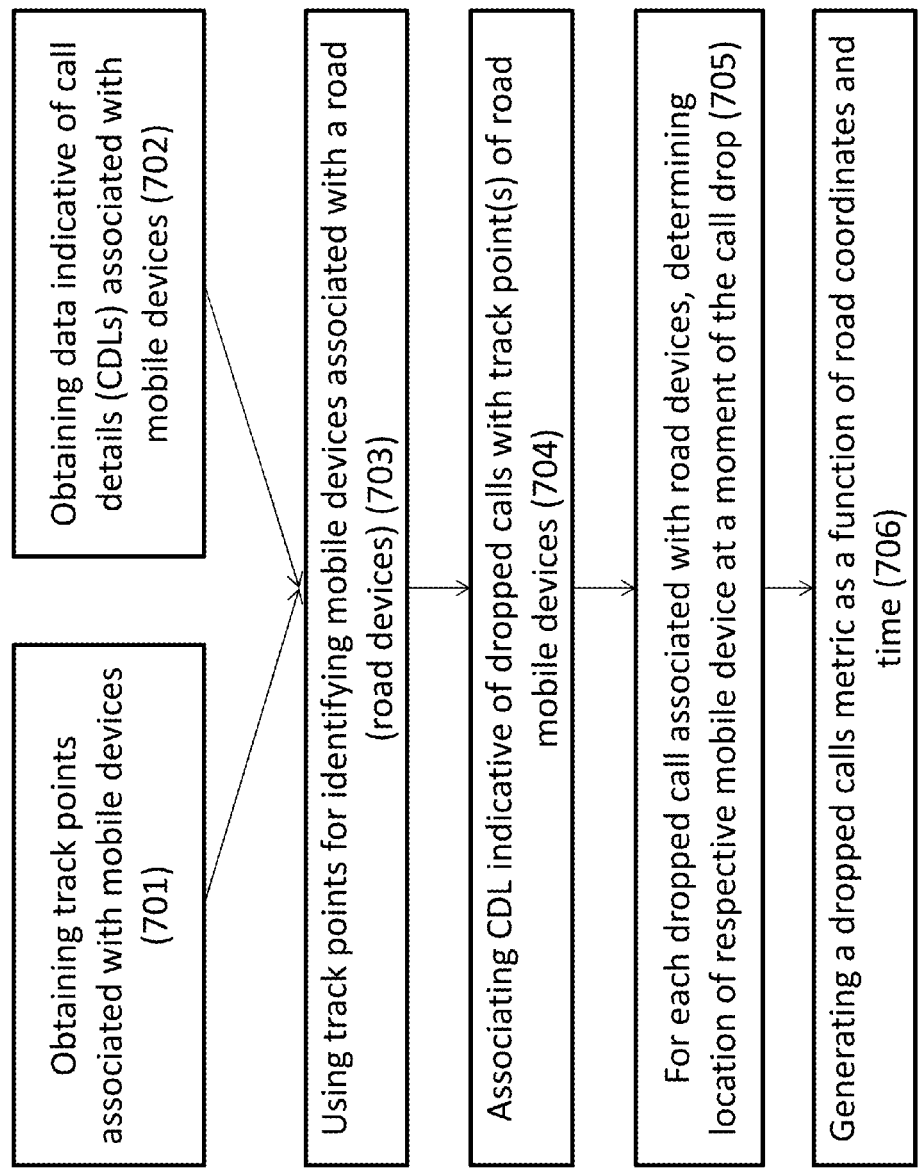
FIG. 7 illustrates a generalized flow diagram of using the generated geo-location database for road-associated DCR mapping in accordance with certain embodiments of the presently disclosed subject matter.

Referring to FIG. 7, there is illustrated a generalized flow diagram of using the generated geo-location database for road-associated DCR mapping in accordance with certain embodiments of the presently disclosed subject matter.

NI server obtains (701) track points from the geo-location database and obtains (702) data indicative of call details associated with mobile devices. NI server further uses track points for identifying (703) mobile devices associated with a road of interest (referred to hereinafter as road devices). By way of non-limiting example, a given mobile device can be considered as associated with a given road at a certain point-in-time if an angle between the azimuth of the respective track point and the given road is less than a predefined threshold, and velocity of the track point corresponds to a reasonable velocity on the road. Alternatively or additionally, a given mobile device can be considered as associated with a given road during a certain period if an average distance from the road, the average distance characterizing a predefined number of track points with time stamps corresponding to the period and associated with the given mobile device, matches a predefined criterion. It is noted that association of mobile devices with the road can be provided using any suitable geo-tracking algorithm.

NI server further associates (704) CDLs indicative of dropped calls and time thereof with track point(s) of the respective road mobile device. The associating can be provided in accordance with correspondence between both: 1) IMSI in CDL and IMSI associated with track point and 2) drop-call indicative time in CDL and time-stamp associated with track point. For each dropped call associated with road devices, NI server determines (705) geo-location of respective mobile device at a moment of the call drop. NI server processes obtained geo-locations to generate (706) a dropped calls metric as a function of road coordinates. Optionally, the drop call metric can be generated as also a function of time and/or time periods (e.g. busy hours, sleeping hours, etc.). A non-limiting example of visualized dropped calls metric as a function of road coordinates and time, is illustrated in FIG. 8.

Figure 8:
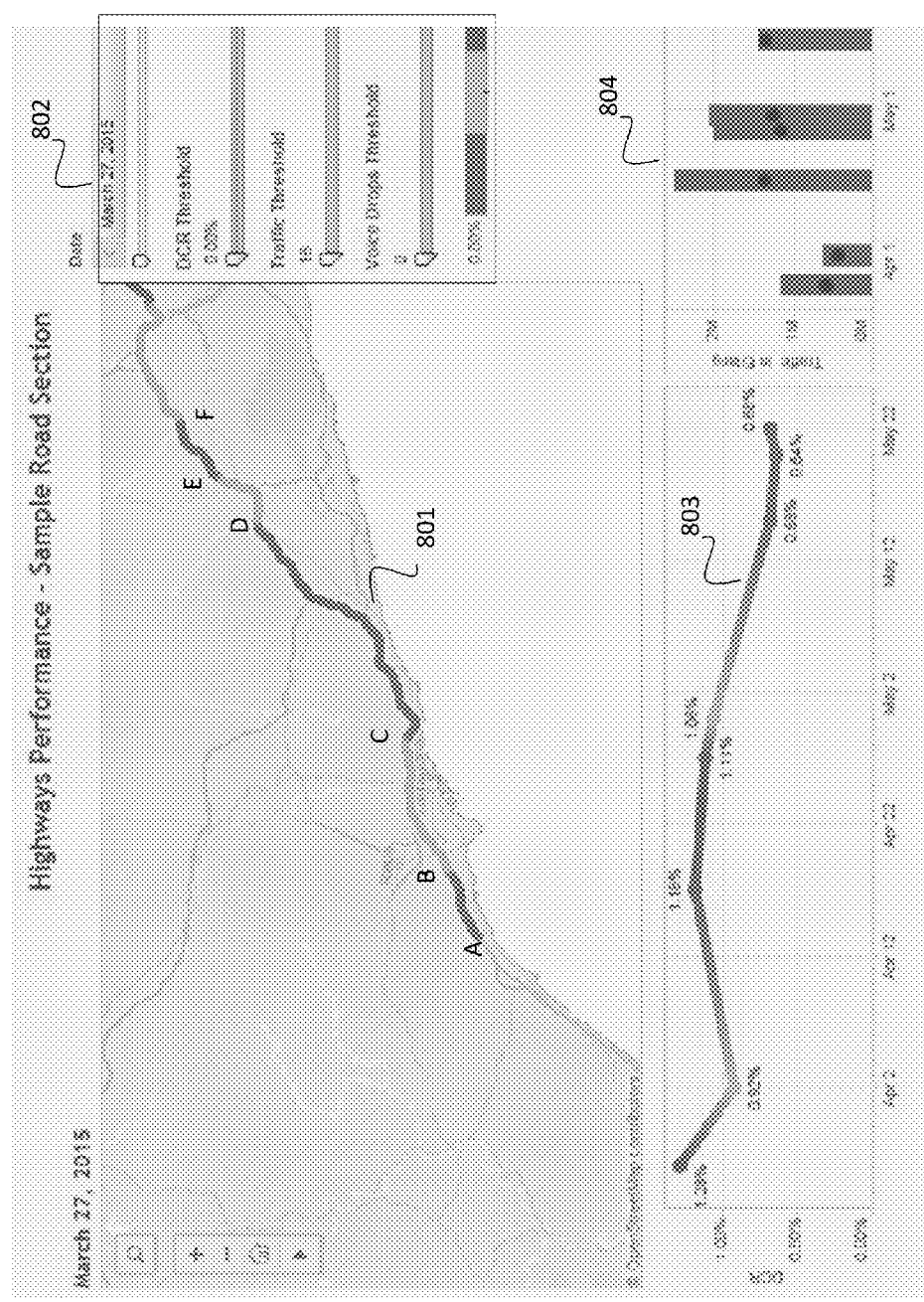
FIG. 8 illustrates an exemplified screen presenting results of DCR analyses for a road 801.

FIG. 8 illustrates an exemplified screen generated by NI server and presenting results of DCR analyses for a road 801. The colour of a road segment is indicative of DCR level. As illustrated, NI server has detected road segments with different CDR levels, namely, on the illustrated date DCR characterizing segments AB, CD and EF is higher than a defined threshold. The date (and, optionally, time period during the date) and the threshold can be configurable via user input 802. Screen 803 presents overall call drops and traffic characterizing the road on different dates. DCRs can be presented for selectable parts of the road as illustrated in screen 804.

Figure 9:
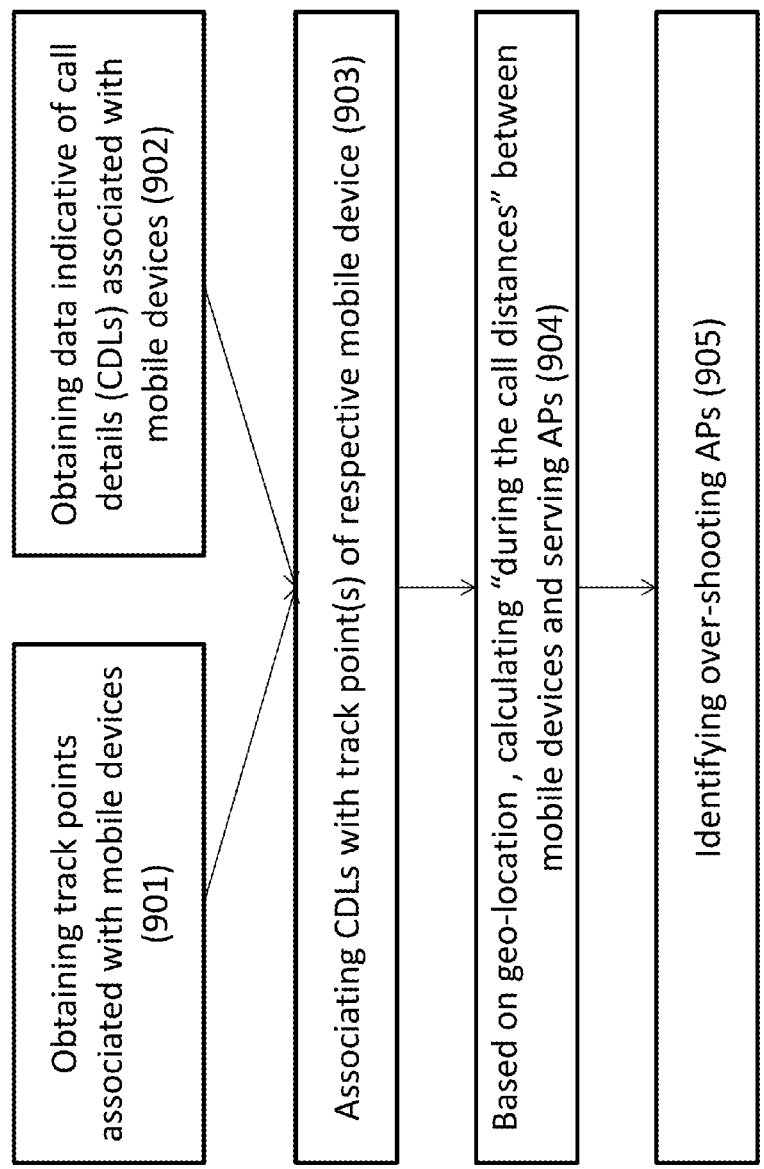
FIG. 9 illustrates a generalized flow diagram of using the generated geo-location database for identifying over-shooting APs.

Referring to FIG. 9, there is illustrated a generalized flow diagram of using the generated geo-location database for identifying over-shooting APs. NI server obtains (901) track points from the geo-location database and obtains (902) data indicative of call details associated with mobile devices. NI server associates (903) CDLs 9 and time thereof with track point(s) of the respective mobile device. The associating can be provided in accordance with correspondence between both: 1) IMSI in CDL and IMSI associated with the track point and 2) call indicative time in CDL and the time-stamp associated with the track point. The associated track point is indicative of geo-location of the mobile phone at the time of the respective call. Accordingly, for each associated call served by a given AP, NI server determines geo-location(s) of the respective mobile device during the call, and processes the obtained data to calculate (904) distance (e.g. average distance, maximal distance, etc.) between the mobile device and the serving AP during the call. NI server uses the calculated distances in order to identify (905) over-shooting APs, i.e. APs characterized by calculated distances (serving range) exceeding a predefined threshold. Optionally, NI server can identify over-shooting APs as access points with serving range exceeding a predefined threshold for a predefined percent of calls during a certain period.

Figure 10:
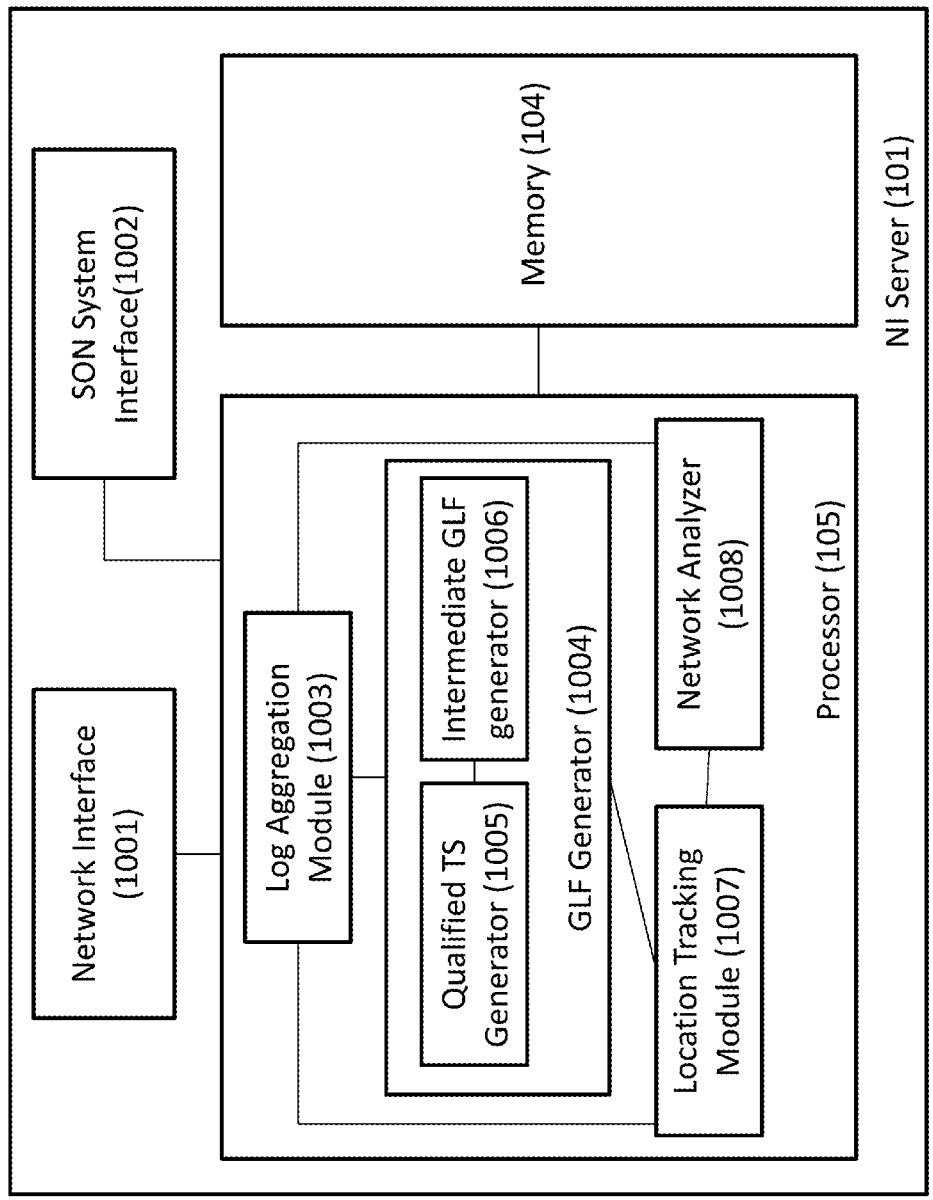
FIG. 10 illustrates a generalized functional diagram of NI server in accordance with certain embodiments of the presently disclosed subject matter.

It is noted that, likewise, NI server can use geo-location database to generate other quality metrics of the cellular system. By way of non-limiting example, NI server can identify and/or predict areas (and/or segments of road) requiring SON-based management and inform SON system accordingly. Thereby, NI server can enable activating SON (or corresponding SON modules) only on areas where, according to geo-location data, drops/bad call events/poor network quality occur. Referring to FIG. 10, there is illustrated a generalized functional diagram of NI server in accordance with certain embodiments of the presently disclosed subject matter. NI server 101 can be implemented as a standalone platform or integrated, fully or partly, with other network entities (e.g. SON system, OSS, CRM, PCRF, etc.). NI server comprises a processor (105) operatively coupled to a first interface (1001) (e.g. a first port) and a second interface (1002) (e.g. a second port). The first interface (referred to hereinafter also as a network interface) is configured to receive from ND depositories data informative of network events and to forward the received data and/or derivatives thereof to the processor 105 and/or memory 104 operatively coupled to the processor. The second interface (referred to hereinafter also as SON interface) is configured to communicate with SON system 106 and to provide to SON system data usable for automatically correcting actions. Optionally, the second interface can communicate with the SON system to receive data indicative of changes in the cellular network provided by the SON system. The processor 105 is configured to provide necessary processing in accordance with operations detailed with reference to FIGS. 2-9.

The processor can comprise operatively coupled log aggregation module 1003, geo-locating transformation function (GLF) generator 1004, location tracking module 1007 and network analyser 1008. The log aggregation module 1003 can be configured to process network-related data (e.g. to index the log records, to extract event data structures, etc.) prior to storing the aggregated log records and/or derivatives thereof in memory 104. The GLF generator 1004 can comprise qualified training dataset generator 1005 and intermediate GLF generator 1006, and can be configured to generate geo-locating transformation function as detailed with reference to FIGS. 2-3. Location tracking module 1007 is configured to generate geo-location database as detailed with reference to FIG. 4. Network analyser 1008 is configured to use geo-location information for analyzing data indicative of network quality as detailed with reference to FIGS. 5-9, generate respective reports and enable communicating the reports to the ND depositories, SON system or other destinations.

It is to be understood that the presently disclosed subject matter is not limited in its application to the details set forth in the description contained herein or illustrated in the drawings. The disclosed technique is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the disclosed subject matter may be, at least partly, a suitably programmed computer. Likewise, the disclosed subject matter contemplates a computer program being readable by a computer for executing the method of the disclosed subject matter. The disclosed subject matter further contemplates a machine-readable non-transitory memory tangibly embodying a program of instructions executable by the machine for executing the method of the disclosed subject matter.

Those skilled in the art will readily appreciate that various modifications and changes can be applied to the embodiments of the disclosed subject matter as hereinbefore described without departing from its scope, defined in and by the appended claims.

What is claimed:

1. A method of analysing data collected in a cellular network, the collected data indicative of network events and associated with mobile devices, the method comprising:
   repeatedly processing, by a processor, a first subset of the collected data to geo-locate mobile devices, thereby giving rise to geo-location data informative of geo-located mobile devices and associated time-stamped geo-locations thereof,
      wherein geo-locating is provided with the help of a geo-locating transformation function generated by unsupervised learning, by the processor, of a second subset of the collected data;
   processing, by the processor, the geo-location data to obtain time-stamped track points, each track point is associated with a respective mobile device and is characterized by geo-location, azimuth and velocity;
   storing, in a memory operatively coupled to the processor, the obtained track points in association with data indicative of respective mobile devices and time-stamps, thereby generating a geo-location database; and
   processing, by the processor, the geo-location database, to obtain one or more metrics of the cellular network as a function of, at least, respective geo-coordinates.

2. The method of claim 1, wherein a relationship between the first subset and the second subset fits a condition selected from a group constituted by the following conditions:
   a. all network events corresponding to collected data in the second subset happening before network events corresponding to the collected data in the first subset;
   b. at least part of the collected data is shared by the first subset and the second subset;
   c. the first subset and the second subset share the same collected data.

3. The method of claim 1, wherein generating the geo-locating transformation function comprises:

generating a training database;
generating a qualified training dataset using the generated training database, wherein the qualified training dataset is informative of a statistically highly-probable relationship between combinations of one or more Radio Resource Control (RRC) parameters in relation to a mobile device and its geo-location;
using the generated qualified training dataset for generating one or more intermediate geo-positioning transformation functions representing the relationship between radio measurements and distance to location; and
selecting one or more generated intermediate geo-positioning transformation functions in accordance of its level of confidence and generating the geo-locating transformation function in accordance with the provided selection.

4. The method of claim 1, wherein obtaining one or more metrics of the cellular network comprises:
associating a) data obtained from the geo-location database track points with zero velocity with b) data indicative of call-drop events and time thereof and obtained from the collected data, wherein associating is provided in accordance with mobile devices and time-stamps respectively associated with the track points and with data indicative of call-drop events;
using the associated track points to determine geo-location of the respectively associated mobile devices at the moments of call-drop events, thereby giving rise to geo-located call-drop events; and
generating a dropped calls metric as a function of the determined geo-located call-drop event.

5. The method of claim 1, wherein obtaining one or more metrics of the cellular network comprises:
processing the geo-location database to identify mobile devices associated with a road of interest to yield road mobile devices, wherein identifying a given mobile device is provided in accordance with relative characteristics of one or more track points associated with the given mobile device and the road characteristics;
associating track-points of the road mobile devices with data indicative of call-drop events and time thereof and obtained from the collected data, wherein associating is provided in accordance with road mobile devices and time-stamps respectively associated with the track points and with data indicative of call-drop events;
using the associated track points to determine geo-location of the respectively associated road mobile devices at the moments of call-drop events, thereby giving rise to geo-located call-drop events; and
generating a dropped calls metric as a function using the geo-located call-drop event, wherein geo-locations and the dropped calls metric are defined with respect the road.

6. The method of claim 1, wherein obtaining one or more metrics of the cellular network comprises:
associating a) data obtained from the geo-location database track points with b) data indicative of call details associated with mobile devices and obtained from the collected data, wherein associating is provided in accordance with mobile devices and time-stamps respectively associated with the track points and with data indicative of call details;
using the associated track points to determine geo-location of the respectively associated mobile devices at the moments of calls, thereby giving rise to geo-located call events;
calculating for each given geo-located call event a distance between a respective mobile device and access point serving this mobile device AP during the given geo-located call event; and
identifying over-shooting access points using the calculated distances.

7. The method of claim 1, wherein at least one metrics is obtained as a function of at least one of a) one or more groups of geo-location coordinates and b) time period.

8. The method of claim 1, further comprising updating the geo-locating transformation function responsive to one or more correcting actions provided by a Self Organizing Network (SON) system.

9. The method of claim 1, further comprising communicating at least one generated metric to a SON system, thereby enabling corresponding correcting actions.

10. The method of claim 9, wherein the communicated metric is indicative of at least one of: a geographical area requiring SON-based correcting actions and SON-based correcting actions to be applied.

11. A system capable of analysing data collected in a cellular network, the collected data indicative of network events and associated with mobile devices, the system comprising a processor operatively coupled to a memory, wherein the processor is configured to:
repeatedly process, a first subset of the collected data to geo-locate mobile devices, thereby giving rise to geo-location data informative of geo-located mobile devices and associated time-stamped geo-locations thereof, wherein the processor is further configured to provide geo-locating with the help of a geo-locating transformation function generated by unsupervised learning of a second subset of the collected data;
to obtain time-stamped track points by processing the geo-location data, each track point is associated with a respective mobile device and is characterized by geo-location, azimuth and velocity;
to generate a geo-location database comprising the obtained track points in association with data indicative of respective mobile devices and time-stamps, and to enable storing the geo-location database in the memory; and
to process the geo-location database to obtain one or more metrics of the cellular network as a function of respective geo-coordinates.

12. The system claim 11, wherein a relationship between the first subset and the second subset fits a condition selected from a group constituted by the following conditions:
a. all network events corresponding to collected data in the second subset happening before network events corresponding to the collected data in the first subset;
b. at least part of the collected data is shared by the first subset and the second subset;
c. the first subset and the second subset share the same collected data.

13. The system claim 11, wherein generation the geo-locating transformation function comprises:
generating a training database;
generating a qualified training dataset using the generated training database, wherein the qualified training dataset is informative of a statistically highly-probable relationship between combinations of one or more RRC parameters in relation to a mobile device and its geo-location;
using the generated qualified training dataset for generating one or more intermediate geo-positioning transformation functions representing the relationship between radio measurements and distance to location; and selecting one or more generated intermediate geo-positioning transformation functions in accordance of its level of confidence and generating the geo-locating transformation function in accordance with the provided selection.

14. The system claim 11, wherein obtaining one or more metrics of the cellular network comprises:

associating a) data obtained from the geo-location database track points with zero velocity with b) data indicative of call-drop events and time thereof and obtained from the collected data, wherein associating is provided in accordance with mobile devices and time-stamps respectively associated with the track points and with data indicative of call-drop events;

using the associated track points to determine geo-location of the respectively associated mobile devices at the moments of call-drop events, thereby giving rise to geo-located call-drop events; and generating a dropped calls metric as a function of the determined geo-located call-drop event.

15. The system claim 11, wherein obtaining one or more metrics of the cellular network comprises:

processing the geo-location database to identify mobile devices associated with a road of interest to yield road mobile devices, wherein identifying a given mobile device is provided in accordance with relative characteristics of one or more track points associated with the given mobile device and the road characteristics;

associating track-points of the road mobile devices with data indicative of call-drop events and time thereof and obtained from the collected data, wherein associating is provided in accordance with road mobile devices and time-stamps respectively associated with the track points and with data indicative of call-drop events;

using the associated track points to determine geo-location of the respectively associated road mobile devices at the moments of call-drop events, thereby giving rise to geo-located call-drop events; and generating a dropped calls metric as a function using the geo-located call-drop event, wherein geo-locations and the dropped calls metric are defined with respect the road.

16. The system claim 11, wherein obtaining one or more metrics of the cellular network comprises:

associating a) data obtained from the geo-location database track points with b) data indicative of call details associated with mobile devices and obtained from the collected data, wherein associating is provided in accordance with mobile devices and time-stamps respectively associated with the track points and with data indicative of call details;

using the associated track points to determine geo-location of the respectively associated mobile devices at the moments of calls, thereby giving rise to geo-located call events;

calculating for each given geo-located call event a distance between a respective mobile device and access point serving this mobile device AP during the given geo-located call event; and identifying over-shooting access points using the calculated distances.

17. The system claim 11, wherein the processor is further configured to update the geo-locating transformation function responsive to one or more correcting actions provided by a SON system.

18. The system claim 11, further comprising an interface operatively coupled to the memory and the processor and configured to communicate at least one generated metric to a SON system.

19. The system of claim 11 integrated with a SON system.

20. A computer program product implemented on a non-transitory computer usable medium having computer readable program code embodied therein to cause the computer to perform a method of analysing data collected in a cellular network, the collected data indicative of network events and associated with mobile devices, the method comprising:

repeatedly processing a first subset of the collected data to geo-locate mobile devices, thereby giving rise to geo-location data informative of geo-located mobile devices and associated time-stamped geo-locations thereof, wherein geo-locating is provided with the help of a geo-locating transformation function generated by unsupervised learning, by the processor, of a second subset of the collected data;

processing the geo-location data to obtain time-stamped track points, each track point is associated with a respective mobile device and is characterized by geo-location, azimuth and velocity;

storing the obtained track points in association with data indicative of respective mobile devices and time-stamps, thereby generating a geo-location database; and processing, by the processor, the geo-location database, to obtain one or more metrics of the cellular network as a function of respective geo-coordinates.

* * * * *

UNITED STATES PATENT AND TRADEMARK OFFICE
CERTIFICATE OF CORRECTION

| | |
|---|---|
| PATENT NO. | : 9,532,180 B2 |
| APPLICATION NO. | : 14/742978 |
| DATED | : December 27, 2016 |
| INVENTOR(S) | : Daniel Dribinski, Evgeny Finkel and Sergei Edelstein |

It is certified that error appears in the above-identified patent and that said Letters Patent is hereby corrected as shown below:

On the Title Page

Item [71], the name and city of the applicant should read:
Cellwize Wireless Technologies Ltd., Tel-Aviv (IL).

Signed and Sealed this
Twenty-seventh Day of March, 2018

Andrei Iancu
*Director of the United States Patent and Trademark Office*